(12) United States Patent
Lin (10) Patent No.: US 12,092,197 B1
(45) Date of Patent: Sep. 17, 2024

(54) DIFFERENTIAL ASSEMBLY WITH DIFFERENTIAL LOCKING APPARATUS

(71) Applicant: Shikai Lin, San Gabriel, CA (US)

(72) Inventor: Shikai Lin, San Gabriel, CA (US)

(*) Notice: Subject to any disclaimer, the term of this patent is extended or adjusted under 35 U.S.C. 154(b) by 0 days.

(21) Appl. No.: 18/394,611

(22) Filed: Dec. 22, 2023

(51) Int. Cl.
*F16H 48/34* (2012.01)
(52) U.S. Cl.
CPC ....... *F16H 48/34* (2013.01); *F16H 2048/346* (2013.01)
(58) Field of Classification Search
CPC ............................. F16H 48/34; F16H 2048/346
See application file for complete search history.

(56) References Cited

U.S. PATENT DOCUMENTS

| 2,803,150 | A | * | 8/1957 | Fisher | ................... | F16H 48/08 74/484 R |
| 2023/0064843 | A1 | * | 3/2023 | Fukuda | ................ | F16H 57/037 |

FOREIGN PATENT DOCUMENTS

CN 2501726 Y * 7/2002 ............. B60K 17/16

* cited by examiner

*Primary Examiner* — Tisha D Lewis
(74) *Attorney, Agent, or Firm* — Tsz Lung Yeung (57) ABSTRACT

A differential assembly includes a differential unit, an electromagnetic valve and an differential locking apparatus including an engaging ring. The differential unit includes a first side gear, a second side gear, and a planet gear engaging with the first side gear and the second side gear. The electromagnetic valve is operated between a first state and a second state. In the first state, the electromagnetic valve is switched to drive the engaging ring to engage with the first side gear, such that the planet gear remains stationary while the first and second side gears are driven to rotate in approximately the same speed. In the second state, the electromagnetic valve is switched to drive the engaging ring to disengage from the first side gear, such that the planet gear can be driven to rotate for driving the first and the second side gears to rotate in different speeds.

7 Claims, 7 Drawing Sheets

DIFFERENTIAL ASSEMBLY WITH DIFFERENTIAL LOCKING APPARATUS

BACKGROUND OF THE PRESENT INVENTION

Field of Invention

The present invention relates to automobile control apparatus, and more particularly to a differential assembly which is actuated by an electromagnetic valve.

Description of Related Arts

Virtually all automobiles utilize a mechanical device called differential to allow the wheels at each side to rotate at different speeds while turning. Broadly speaking, a differential is a gear train with three drive shafts which connect the vehicle engine and two corresponding wheels. When an automobile moves in a straight path, the wheels move in approximately equal speed and the differential is deactivated. However, when the automobile turns, the differential is actuated so that one of the wheels moves faster than the corresponding wheel on the other side. The goal of the differential is to transfer the engine's power to the wheels while still allowing the wheels to rotate at different speeds.

A typical differential typically comprises a ring gear, a plurality of sun gears connecting to the wheels respectively, and a plurality of planet gears engaging with the sun gears. When an input torque from the automobile's engine is applied to the ring gear, the resistance from both wheels should remain approximately the same, and the planet gear does not rotate about its axis. This causes the sun gears and the wheels to rotate at the same speed. These happen when the automobile moves in a straight path.

When the automobile is about to turn, input torque is applied to the ring gear. However, one of the wheels now provides more resistance than the other. This causes the planet gears to rotate about its own axis. This produces different rotational speed for the two sun gears, resulting in different speeds of the wheels.

A major disadvantage of conventional differentials such as the one mentioned above is that the conventional differentials are usually actuated by hydraulic transmission systems or pneumatic transmission systems. These actuation systems are complex in structure and are not very reliable.

SUMMARY OF THE PRESENT INVENTION

Certain variations of the present invention provide a differential assembly which is actuated by an electromagnetic valve so that the entire system is structurally simple and reliable.

Certain variations of the present invention provide a differential assembly comprising a differential unit and an electromagnetic valve, wherein by controlling and actuating the electromagnetic valve, the differential unit may be correspondingly actuated so as to adjust the speeds of the wheels coupling to the differential unit.

In one aspect of the present invention, it provides a differential assembly for an automobile having an engine, a first wheel and a second wheel opposite to the first wheel, the differential assembly comprising:

a differential unit, which comprises:
   an outer case;
   a main gear supported by the outer case and adapted for connecting to the engine of the automobile;
   a first side gear adapted for connecting to the first wheel of the automobile;
   a second side gear adapted for connecting to the second wheel of the automobile; and
   at least one planet gear engaging with the first side gear and the second side gear; and
an electromagnetic valve; and
a differential locking apparatus which comprises:
   a transmission arm having a first end portion coupled to the electromagnetic valve, and a second end portion extending from the first end portion; and
   an engaging ring arranged to be drive by the second end portion of the transmission arm, the electromagnetic valve being operated between a first state and a second state, wherein in the first state, the electromagnetic valve is switched to drive the transmission arm to move the engaging ring to engage with the first side gear, such that when the main gear is driven to rotate, the planet gear is not moved while the first side gear and the second side gear are driven to rotate in approximately the same speed, wherein in the second state, the electromagnetic valve is switched to drive the transmission arm to move the engaging ring to disengage from the first side gear, such that when the main gear is driven to rotate, the planet gear is also driven to rotate for driving the first side gear and the second side gear to rotate in different speed.

This summary presented above is provided merely to introduce certain concepts and not to identify any key or essential features of the claimed subject matter.

DETAILED DESCRIPTIONS OF THE PRESENT INVENTION

The following detailed description of the preferred embodiment is the preferred mode of carrying out the invention. The description is not to be taken in any limiting sense. It is presented for the purpose of illustrating the general principles of the present invention.

In the following descriptions, it should also be appreciated that the terms "arrange" and "set" in the following description refer to the connecting relationship in the accompanying drawings for easy understanding of the present invention. For example, the "arrange" and "set" may refer to one element directly or indirectly set or arrange on another element. Therefore, the above terms should not be an actual connection limitation of the elements of the present invention.

It should also be appreciated that the terms "center", "length", "width", "thickness", "top", "bottom", "front", "rear", "left", "right", "vertical", "horizontal", "upper", "lower", "interior", and "exterior" in the following description refer to the orientation or positioning relationship in the accompanying drawings for easy understanding of the present invention without limiting the actual location or orientation of the present invention. Therefore, the above terms should not be an actual location limitation of the elements of the present invention.

Moreover, it should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

It should be appreciated that the terms "install", "connect", "couple", and "mount" in the following description refer to the connecting relationship in the accompanying drawings for easy understanding of the present invention. For example, the connection may refer to permanent connection or detachable connection. Therefore, the above terms should not be an actual connection limitation of the elements of the present invention.

Referring to FIG. 1 to FIG. 4, FIG. 5A, FIG. 5B, FIG. 6A, FIG. 6B, FIG. 7A and FIG. 7B of the drawings, a differential assembly according to a preferred embodiment of the present invention is illustrated. The differential assembly may be used in an automobile having an engine, a first wheel 100 and a second wheel 200 opposite to the first wheel 100. The purpose of the differential assembly is to adjust the speed of the wheels so that when the automobile turns, the speeds of the opposing wheels will be different for facilitating smooth turning of the automobile. Broadly, the differential assembly may comprise a differential unit 10, an electromagnetic valve 20, and a differential locking apparatus 30.

The differential unit 10 may comprise an outer case 11, a main gear 12, a first side gear 13, a second side gear 14, and at least one planet gear 15.

The main gear 12 may be supported by the outer case 11 and adapted for connecting to the engine of the automobile.

The first side gear 13 may be adapted for connecting to the first wheel 100 of the automobile. The second side gear 14 may be adapted for connecting to the second wheel 200 of the automobile.

The planet gear 15 may be engaged with the first side gear 13 and the second side gear 14 in the outer case 11. In this preferred embodiment, the differential may comprise a plurality of planet gears 15 engaging with the first side gear 13 and the second side gear 14.

The differential locking apparatus 30 may operatively connect the electromagnetic valve 20 to the differential unit 10 so as to allow the operation of the differential unit 10 to be controlled and actuated by the electromagnetic valve 20. The differential locking apparatus 30 may comprise a transmission arm 31 and an engaging ring 32.

The transmission arm 31 may have a first end portion 311 coupled to the electromagnetic valve 20, and a second end portion 312 extending from the first end portion 311.

The engaging ring 312 may be arranged to be driven by the second end portion 312 of the transmission arm 31. The electromagnetic valve 20 may be operated between a first state and a second state, wherein in the first state, the electromagnetic valve 20 may be switched to drive the transmission arm 31 to move the engaging ring 312 to engage with the first side gear 13, such that when the main gear 12 is driven to rotate, the planet gear 15 is not moved (remains stationary) while the first side gear 13 and the second side gear 14 are driven to rotate in approximately the same speed. In the second state, the electromagnetic valve 20 may be switched to drive the transmission arm 31 to move the engaging ring 312 to disengage from the first side gear 13, such that when the main gear 12 is driven to rotate, the planet gear 15 is also driven to rotate for driving the first side gear 12 and the second side gear 13 to rotate in different speed. The difference in wheel's speed allows the automobile to turn in a smooth and controlled manner.

According to the preferred embodiment of the present invention, the outer case 11 may comprise a first casing member 111 and a second casing member 112 connected to the first casing member 111. The outer case 11 may have a receiving cavity 113 formed therein for defining a hollow structure of the outer case 11. The first side gear 13, the second side gear 14 and the planet gear 15 may be received in the receiving cavity 113. As shown in FIG. 1 to FIG. 4 of the drawings, each of the first casing member 111 and the second casing member 112 may have a substantially circular cross-sectional shape when viewed from the side.

The main gear 12 may be connected to the automobile's engine through a clutching device. The clutching device may be a conventional clutching device equipped in the automobile. The main gear 12 may be connected to the clutching device for acquiring the initial power to drive the wheels of the automobile. The main gear 12 may be supported by the outer case 11 in such a manner that the main gear 12 may radially and peripherally extend from the outer case 11. The main gear 12 may have a plurality of main gear teeth 121 arranged to be connected to the clutching device, preferably through other gear assemblies in the automobile. When the electromagnetic valve 20 is operated in the first state, the main gear 12 may be driven to rotate and drive the outer case 11, the first side gear 13, and the second side gear 14 to rotate in a synchronized manner so that the first wheel 100 and the second wheel 200 may rotate at the same speed. This situation may be illustrated in FIG. 3 of the drawings.

On the other hand, the first side gear 13 may be connected to the first wheel 100 for driving it to rotate at a predetermined speed. As shown in Fig. FIG. 1 to FIGS. 3 and 6A and FIG. 6B of the drawings, the first side gear 13 may comprise a first gear member 131, and a first driving shaft 132 extending from the first gear member 131 for connecting to the first wheel 100. The first driving shaft 132 may extend out of the outer case 11 for connecting to the first wheel 100 which is distant away from the differential assembly of the present invention.

It is worth mentioning that the first gear member 131 may have a plurality of peripheral teeth 1311 formed along a circumference of the first gear member 131, and a plurality of first side teeth 1312 formed along and extends toward an axial direction of the first gear member 131 on an inner side thereof. To explicate more clearly, the first gear member 131 may have a substantially circular cross section when viewed from the side, wherein the peripheral teeth 1311 may be formed alone the circumference of the first gear member 131. Each of the peripheral teeth 1311 may be directed along a radial direction of the first gear member 131.

On the other hand, the first side teeth 1312 may be formed on an inner side of the first gear member 131 so that the first side teeth 1312 may be directed along the axial direction of the first gear member 131 (i.e. facing in the direction parallel to the axis of rotation of the first gear member 131). Thus, the first gear member 131 may be arranged to engage with gears which may rotate along two different axes of rotation respectively. These two axes of rotation may extend along two different planes.

Figure 5A:
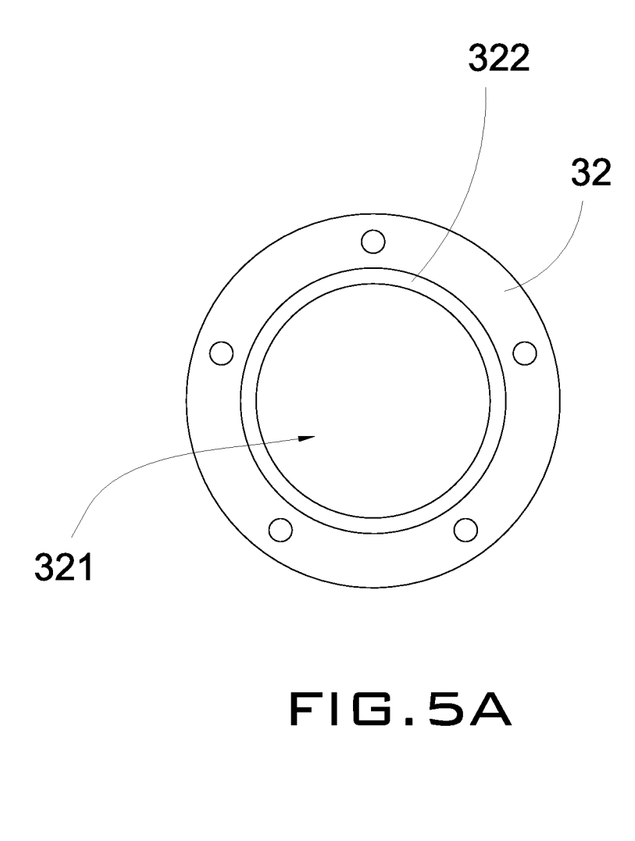
FIG. 5A is a sectional front view of an annular lock plate of the differential assembly according to the preferred embodiment of the present invention.
Figure 5B:
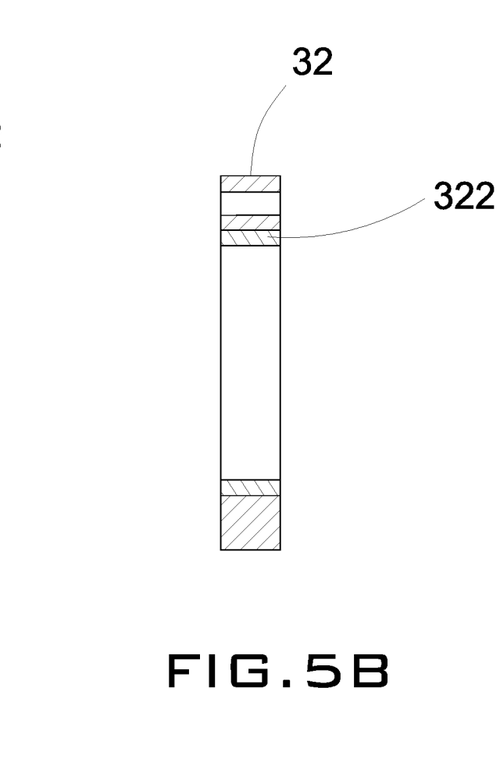
FIG. 5B is a sectional side view of the annular lock plate of the differential assembly according to the preferred embodiment of the present invention.
Figure 6A:
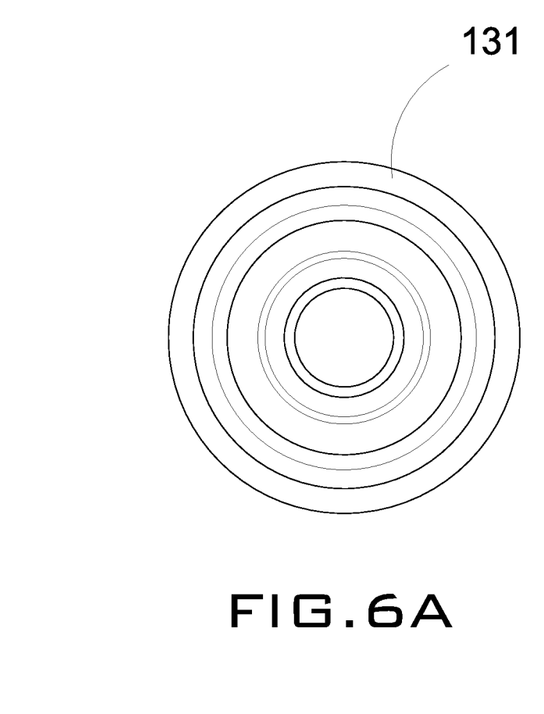
FIG. 6A is a sectional front view of a first side gear of the differential assembly according to the preferred embodiment of the present invention.
Figure 6B:
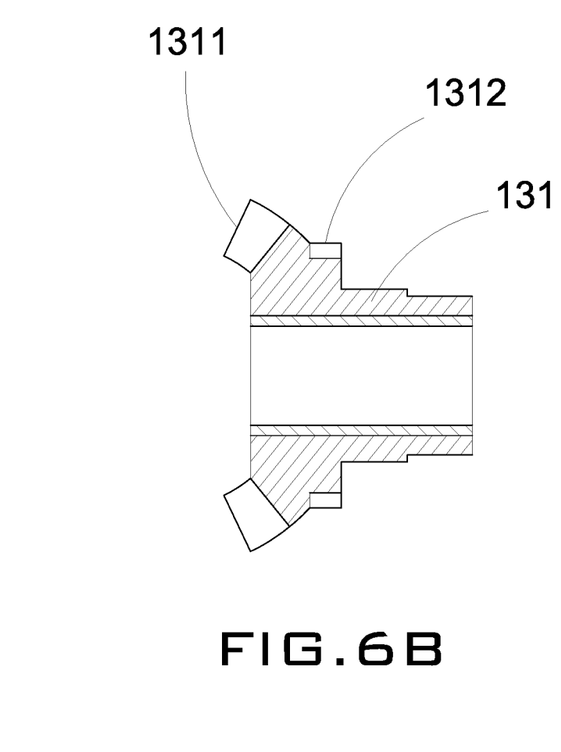
FIG. 6B is a sectional side view of the first side gear of the differential assembly according to the preferred embodiment of the present invention.
Figure 7A:
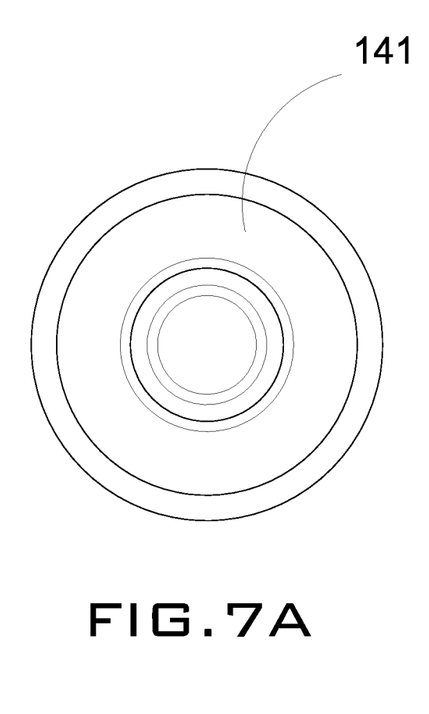
FIG. 7A is a sectional front view of a second side gear of the differential assembly according to the preferred embodiment of the present invention.
Figure 7B:
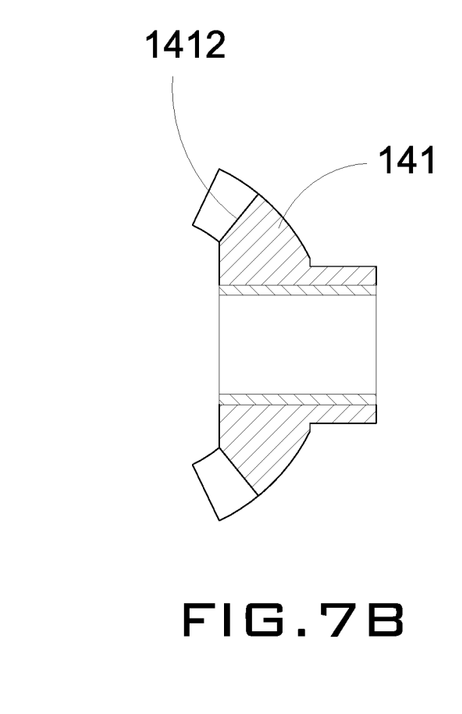
FIG. 7B is a sectional side view of the second side gear of the differential assembly according to the preferred embodiment of the present invention.

As shown in FIG. 5A and FIG. 5B of the drawings, the engaging ring 32 of the differential locking apparatus 30 may be provided in the receiving cavity 113 of the outer case 11 for selectively engaging with the first gear member 131 of the first side gear 13. More specifically, the engaging ring 32 may have a ring-shaped structure and a through hole 321. The engaging ring 32 may further have a plurality of locking teeth 322 formed on a side boundary of the through hole 321, wherein the peripheral teeth 1311 of the first gear member 131 may be arranged to selectively engage with the locking teeth 322 of the engaging ring 32. Thus, a diameter of the through hole 321 may be substantially the same as an outer diameter of the first gear member 131.

The differential locking apparatus 30 may further comprise a locking ring 33 rotatably connected to the second end portion 312 of the transmission arm 31 and may be arranged to drive the engaging ring 32 to move. The locking ring 33 may be positioned outside the outer case 11. Since the first end portion 311 of the transmission arm 31 may be connected to the electromagnetic valve 20, when the electromagnetic valve 20 is operated between the first state and the second state, the electromagnetic valve 20 may drive the transmission arm 31 to move in a predetermined direction with respect to the outer case 11.

According to the preferred embodiment of the present invention, the transmission arm 31 may be driven to move by the electromagnetic valve 20 in a direction parallel to a longitudinal direction of the outer case 11. This direction of movement may be parallel to the axial direction of the engaging ring 32 and the first gear member 131 of the first side gear 13. Thus, the transmission arm 31 may drive the locking ring 33 to move along a longitudinal direction of the outer case 11, and this mechanism may drive the engaging ring 32 to move along a longitudinal direction of the outer case 11 as well. Since the engaging ring 32 is provided in the receiving cavity 113, a movement of the engaging ring 32 along a longitudinal direction of the outer case 11 may allow the locking teeth 322 of the engaging ring 32 to selectively engage with the peripheral teeth 1311 of the first gear member 131. These can be illustrated in FIG. 1 and FIG. 2 of the drawings.

Moreover, when the locking ring 33 is driven to move along a longitudinal direction of the outer case 11, the locking ring 33 may be driven to engage with the outer case 11, preferably through a plurality of engagement latches 331, so that the locking ring 33 may move with the outer case 11 in a synchronized manner. Conversely, when the locking ring 33 is driven to move along a longitudinal direction and away from the outer case 11, the outer case 11 may be "unlocked" by the locking ring 33 so that a rotation of the outer case 11 will not affect the movement of the locking ring 33.

As shown in FIG. 1 to FIG. 4 and FIG. 7A and FIG. 7B of the drawings, the second side gear 14 may be operatively provided in the outer case 11 at a position opposite to the first side gear 13. The second side gear 14 may comprise a second gear member 141 and a second driving shaft 142 extending from the second gear member 141 for connecting to the second wheel 200. The second driving shaft 142 may extend out of the outer case 11 for connecting to the second wheel 200 which is also distant away from the differential assembly of the present invention.

Figure 1:
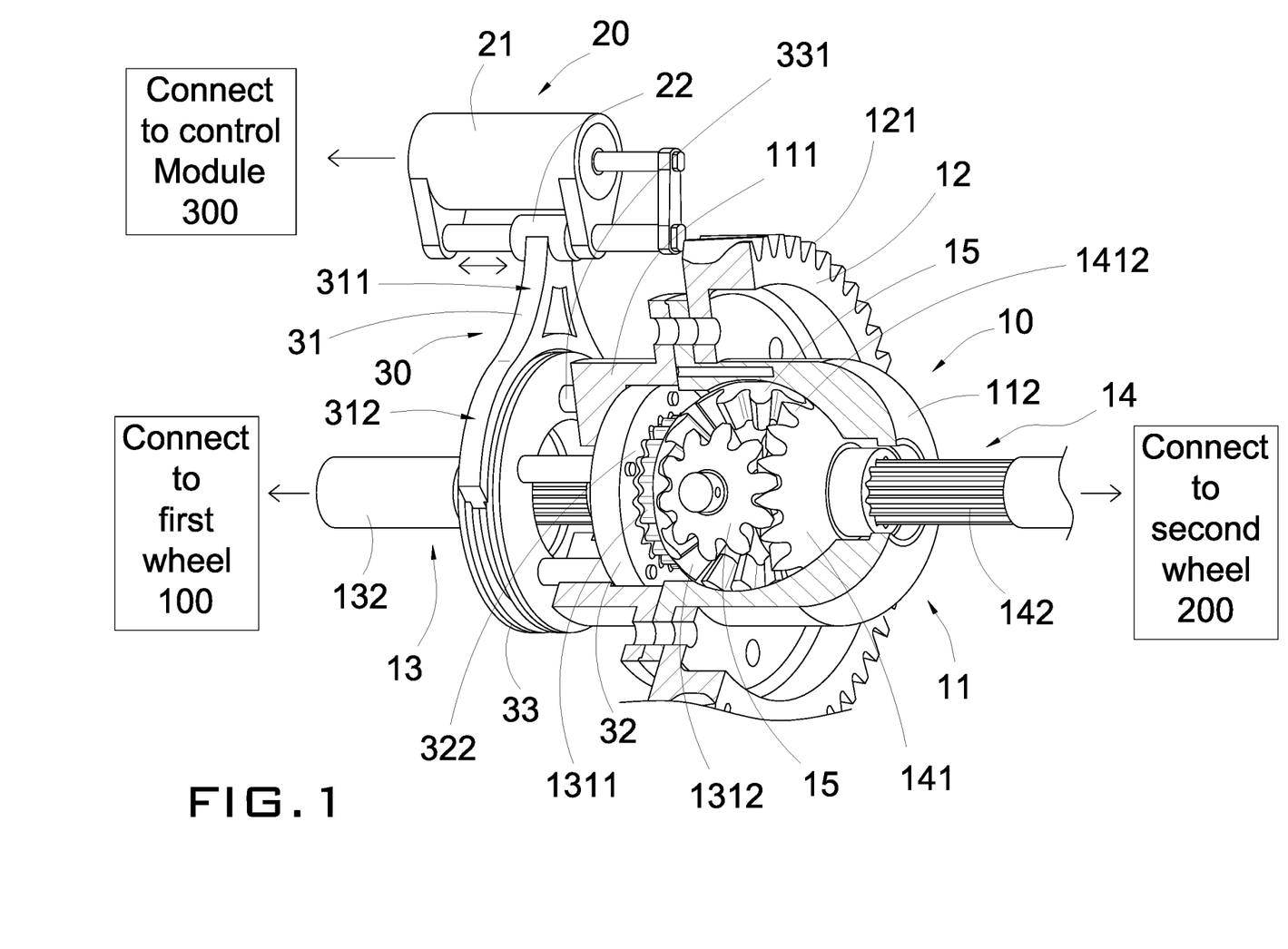
FIG. 1 is a perspective view of a differential assembly according to a preferred embodiment of the present invention, illustrating that an electromagnetic valve value is being operated in the second state.
Figure 2:
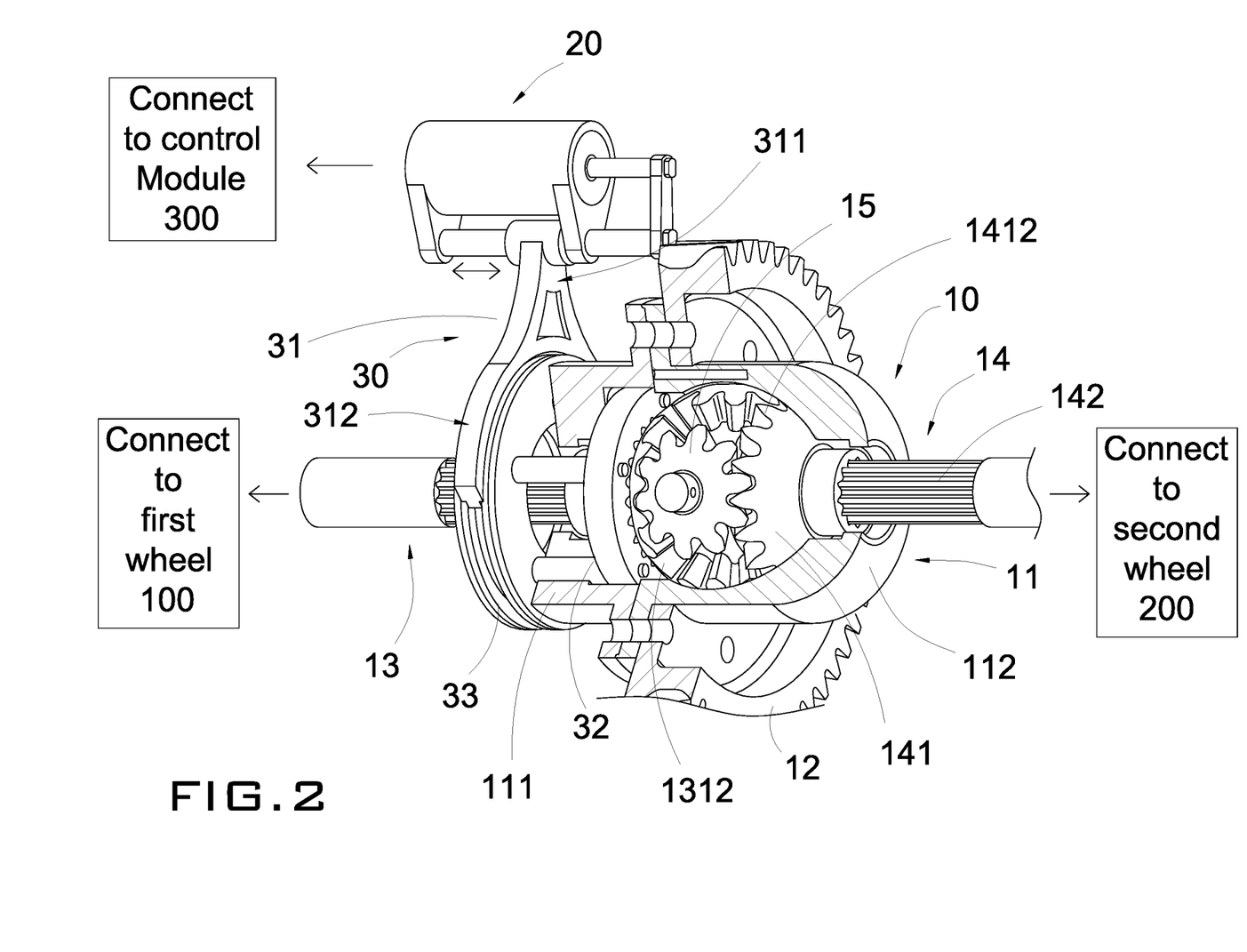
FIG. 2 is a perspective view of a differential assembly according to the preferred embodiment of the present invention, illustrating that an electromagnetic valve value is being switched between a second state and a first state.
Figure 3:
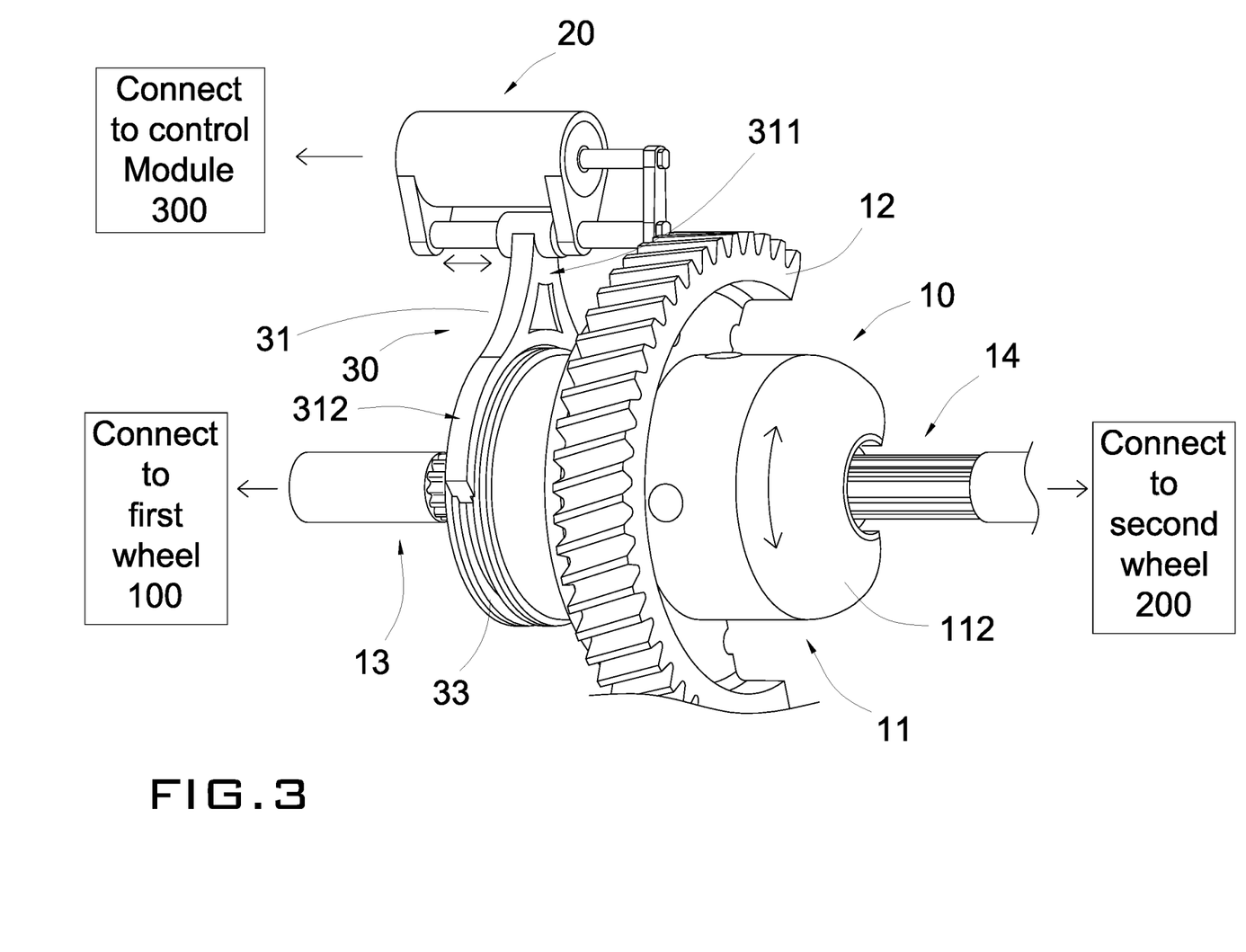
FIG. 3 is a perspective view of a differential assembly according to the preferred embodiment of the present invention, illustrating that an electromagnetic valve value is being operated in the first state.
Figure 4:
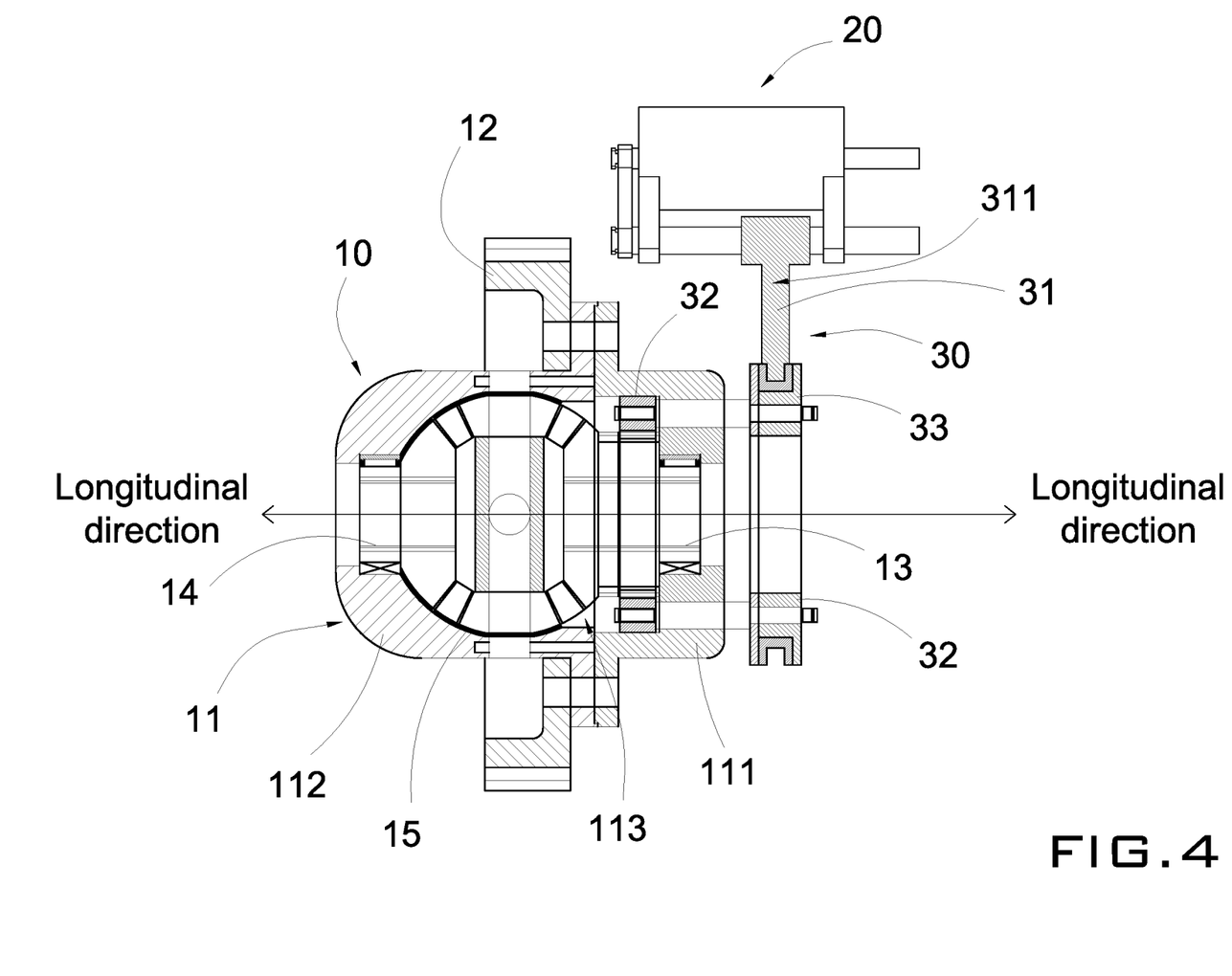
FIG. 4 is a sectional side view of the differential assembly according to the preferred embodiment of the present invention.

It is worth mentioning that the second gear member 141 may have a plurality of second side teeth 1412 formed and extend along an axial direction of the second gear member 141 on an inner side thereof. So, the second gear member 141 may have a substantially circular cross section when viewed from the side, wherein the second side teeth 1412 may be formed on an inner side of the second gear member 141 so that the second side teeth 1412 may be directed along the axial direction of the second gear member 141 (i.e. facing the direction parallel to the axis of rotation of the second gear member 141). As shown in FIG. 1 of the drawings, the first driving shaft 132 and the second driving shaft 142 extend toward two opposing sides of the outer case 11.

The differential unit 10 may comprise a plurality of (but at least one) planet gears 15, wherein each of the planet gears 15 may engage with the first side gear 13 and the second side gear 14. The planet gears 15 may be received in the receiving cavity 113 of the outer case 11. Each of the planet gears 15 may have a plurality of planet teeth 151 formed along a circumference thereof, wherein the planet teeth 151 may engage with the first side teeth 1312 and the second side teeth 1412 respectively. In other words, each of the planet gear 15 may be positioned in between the first gear member 131 and the second gear member 141.

The engagement of the planet teeth 151 between the first gear member 131 and the second gear member 141 may allow the first side gear 13 and the second side gear 14 to rotate at different speeds. This facilitates smooth turning of the automobile in which the differential assembly installs. As shown in FIG. 1 of the drawings, an axial direction of each of the planet gear 15 may be perpendicular to the axial direction of the first side gear 13 and the second side gear 14. The first side gear 13 and the second side gear 14 may have a parallel axis of rotation.

The electromagnetic valve 20 may be positioned outside the outer case 11 and may comprise a main unit 21 and an actuating latch 22 operatively connected to the main unit 21. The main unit 21 may be connected to a control module 300 of the automobile. The control module 300 may be incorporated in the main processing unit of the automobile for controlling the operation thereof. The actuating latch 22 may be connected to the first end portion 311 of the transmission arm 31 and may be actuated to move between two positions which may correspond to the first state and the second state respectively. When switching between the first state and the second state, the actuating latch 22 may move linearly and substantially parallel to a longitudinal direction of the outer case 11. Thus, when the actuating latch 22 is driven to move, the first end portion 311 of the transmission arm 31 may also be driven to move along a longitudinal direction of the outer case 11. This in turn may drive the second end portion 312 of the transmission arm 31 and the locking ring 33 to move correspondingly. Since the locking ring 33 is connected to the engaging ring 32, the engaging ring 32 may also be driven to move along a longitudinal direction of the outer case 11 for selectively engaging to and disengaging from the first gear member 131.

The operation of the present invention may be described as follows: when the electromagnetic valve 20 is in the first state, the electromagnetic valve 20 may be switched to allow the actuating latch 22 to drive the transmission arm 31 to move the engaging ring 32 to engage with the first gear member 131 of the first side gear 13 in the manner described above. Moreover, the locking ring 33 may also be driven to engage with the outer case 11. In this situation, the engaging ring 32, the locking ring 33 and the outer case 11 are mechanically connected in such a manner that they can only be rotated in a synchronized manner. Thus, when the main gear 12 is driven to rotate through the clutching device and the automobile engine, the planet gears 15 may be kept stationary while the first side gear 13 and the second side gear 14 along with the outer case 11 may be driven to rotate in a synchronized manner and in approximately the same speed. This is the situation where the automobile is moving in a straight path.

Since the outer case 11 is driven to rotate by the main gear 12, the first side gear 13, the second side gear 14 and the planet gears 15 may rotate together with the outer case 11. However, there is no lateral movement or relative movement between the first side gear 13, the second side gear 14, and the planet gears 15.

When the electromagnetic valve 20 is in the second state, the electromagnetic valve 20 may be switched to allow the actuating latch 22 to drive the transmission arm 31 to move along a longitudinal direction and away from the outer case 11 so as to move the locking ring 33 and the engaging ring 32 to disengage from the first gear member 131 of the first side gear 13 in the manner described above first side gear 13. In this situation, when the main gear 12 is driven to rotate, the planet gears 15 may also be driven to rotate for driving the first side gear 13 and the second side gear 14 to rotate in different speeds. Furthermore, since the outer case 11 is driven to rotate by the main gear 12, the first side gear 13, the second side gear 14 and the planet gears 15 may also rotate together with the outer case 11.

The present invention, while illustrated and described in terms of a preferred embodiment and several alternatives, is not limited to the particular description contained in this specification. Additional alternative or equivalent components could also be used to practice the present invention.

What is claimed is:

1. A differential assembly for an automobile having an engine, a first wheel and a second wheel opposite to the first wheel, the differential assembly comprising:
   a differential unit, which comprises:
   an outer case having a receiving cavity formed therein for defining a hollow structure;
   a main gear supported by the outer case and adapted for connecting to the engine of the automobile;
   a first side gear which is adapted for connecting to the first wheel of the automobile, and comprises a first gear member and a first driving shaft extending from the first gear member for connecting to the first wheel, the first gear member having a plurality of peripheral teeth formed along a circumference of the first gear member, and a plurality of first side teeth formed along and extends toward an axial direction of the first gear member on an inner side thereof;
   a second side gear adapted for connecting to the second wheel of the automobile; and
   at least one planet gear engaging with the first side gear and the second side gear, the first side gear, the second side gear and the planet gear being received in the receiving cavity of the outer case;
   an electromagnetic valve; and
   a differential locking apparatus which comprises:
   a transmission arm having a first end portion coupled to the electromagnetic valve, and a second end portion extending from the first end portion; and
   an engaging ring arranged to be driven by the second end portion of the transmission arm, the electromagnetic valve being operated between a first state and a second state, wherein in the first state, the electromagnetic valve is switched to drive the transmission arm to move the engaging ring to engage with the first side gear, such that when the main gear is driven to rotate, the planet gear is not moved while the first side gear and the second side gear are driven to rotate in approximately the same speed, wherein in the second state, the electromagnetic valve is switched to drive the transmission arm to move the engaging ring to disengage from the first side gear, such that when the main gear is driven to rotate, the planet gear is also driven to rotate for driving the first side gear and the second side gear to rotate in different speed, the engaging ring of the differential locking apparatus being provided in the receiving cavity of the outer case for selectively engaging with the first gear member of the first side gear, the engaging ring having a ring-shaped structure, a through hole, and a plurality of locking teeth formed on a side boundary of the through hole, wherein the peripheral teeth of the first gear member are arranged to selectively engage with the locking teeth of the engaging ring.

2. A differential assembly for an automobile having an engine, a first wheel and a second wheel opposite to the first wheel, the differential assembly comprising:
   a differential unit, which comprises:
   an outer case having a receiving cavity formed therein for defining a hollow structure;
   a main gear supported by the outer case and adapted for connecting to the engine of the automobile, the main gear being supported by the outer case such that the main gear is arranged to radially and peripherally extend from the outer case, the main gear having a plurality of main gear teeth adapted for being connected to the engine;
   a first side gear which is adapted for connecting to the first wheel of the automobile, and comprises a first gear member and a first driving shaft extending from the first gear member for connecting to the first wheel, the first gear member having a plurality of peripheral teeth formed along a circumference of the first gear member, and a plurality of first side teeth formed along and extends toward an axial direction of the first gear member on an inner side thereof;
   a second side gear adapted for connecting to the second wheel of the automobile; and
   at least one planet gear engaging with the first side gear and the second side gear, the first side gear, the second side gear and the planet gear being received in the receiving cavity of the outer case;

an electromagnetic valve; and a differential locking apparatus which comprises:

a transmission arm having a first end portion coupled to the electromagnetic valve, and a second end portion extending from the first end portion; and an engaging ring arranged to be driven by the second end portion of the transmission arm, the electromagnetic valve being operated between a first state and a second state, wherein in the first state, the electromagnetic valve is switched to drive the transmission arm to move the engaging ring to engage with the first side gear, such that when the main gear is driven to rotate, the planet gear is not moved while the first side gear and the second side gear are driven to rotate in approximately the same speed, wherein in the second state, the electromagnetic valve is switched to drive the transmission arm to move the engaging ring to disengage from the first side gear, such that when the main gear is driven to rotate, the planet gear is also driven to rotate for driving the first side gear and the second side gear to rotate in different speed, the engaging ring of the differential locking apparatus being provided in the receiving cavity of the outer case for selectively engaging with the first gear member of the first side gear, the engaging ring having a ring-shaped structure, a through hole, and a plurality of locking teeth formed on a side boundary of the through hole, wherein the peripheral teeth of the first gear member are arranged to selectively engage with the locking teeth of the engaging ring.

3. The differential assembly, as recited in claim 2, wherein the differential locking apparatus further comprises a locking ring positioned outside the outer case, and rotatably connected to the second end portion of the transmission arm, and is arranged to drive the engaging ring to engage with and disengage from the first gear member when the electromagnetic valve is operated between the first state and the second state.

4. The differential assembly, as recited in claim 3, wherein the locking ring is connected to the outer case in such a manner that when the electromagnetic valve is in the first state, the locking ring is driven to move along a longitudinal direction of the outer case so as to engage with the outer case for allowing the locking ring to move with the outer case in a synchronized manner, wherein when the electromagnetic valve is in the second state, the locking ring is driven to move along a longitudinal direction and away from the outer case so that rotation of the outer case does not affect the movement of the locking ring.

5. The differential assembly, as recited in claim 4, wherein the second side gear comprises a second gear member and a second driving shaft extending from the second gear member for connecting to the second wheel, the second gear member having a plurality of second side teeth formed and extend along an axial direction of the second gear member on an inner side thereof, the first side teeth and the second side teeth being opposite to each other.

6. The differential assembly, as recited in claim 5, wherein the planet gear has a plurality of planet teeth formed along a circumference thereof, wherein the planet teeth are arranged to engage with the first side teeth and the second side teeth respectively, the planet gear being installed and positioned between the first gear member and the second gear member in the outer case.

7. The differential assembly, as recited in claim 6, wherein the electromagnetic valve is positioned outside the outer case and comprises a main unit and an actuating latch operatively connected to the main unit, the actuating latch being connected to the first end portion of the transmission arm and actuated to move between two positions which correspond to the first state and the second state respectively, such that when switching between the first state and the second state of the electromagnetic valve, the actuating latch is driven to move linearly and substantially parallel to a longitudinal direction of the outer case for driving the transmission arm to move correspondingly.

* * * * *